Aug. 27, 1940.     E. H. LAND     2,212,880
FIELD DIVIDER
Filed Jan. 29, 1938
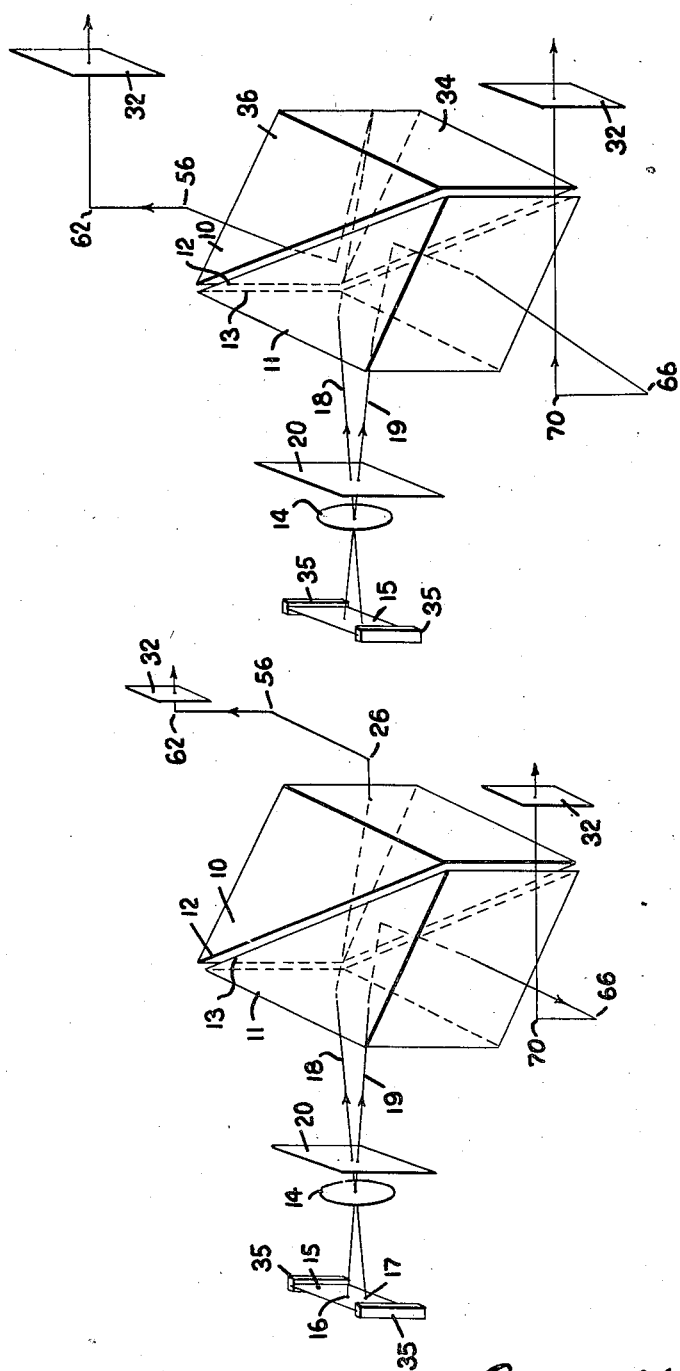
INVENTOR.
Edwin H. Land
BY Brown & Jones
ATTORNEYS.

Patented Aug. 27, 1940

2,212,880

UNITED STATES PATENT OFFICE 2,212,880

FIELD DIVIDER

Edwin H. Land, Boston, Mass., assignor, by mesne assignments, to Polaroid Corporation, Dover, Del., a corporation of Delaware Application January 29, 1938, Serial No. 187,580

1 Claim. (Cl. 88—16.6)

This invention relates to new and improved optical systems, and more particularly to an improved beam-splitter or field divider.

This application is a continuation in part of my co-pending application, Serial No. 755,679, filed December 3, 1934, now Patent No. 2,106,752.

An object of the invention is to provide apparatus comprising, in combination, a beam-splitter and a reflecting surface, and such other elements as will permit the employment of said beam-splitter and said reflecting surface as an attachment for a camera or for a projector whereby said camera or projector may be adapted for stereoscopic purposes.

A further object of the invention is to provide, in connection with the simple form of beam-splitter hereinafter described, suitable means whereby the conventional frame shape in motion picture photography may be retained.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claim.

For a fuller understanding of the nature and objects of the invention, reference should be had to the following detailed description, taken in connection with the accompanying drawing, in which:

Figure 1 is a diagrammatic representation of a device embodying one form of the invention and of the paths taken by rays forming each of the stereoscopic images transmitted through the device when the device is equipped with means for preserving the standard frame shape now used in motion picture photography; and Fig. 2 is a diagrammatic representation of the paths taken by such beams in a modification of the structure shown diagrammatically in Fig. 1.

In simple form, the device may comprise a pair of 45° prisms placed with their hypotenuses parallel, and with an air gap therebetween, the two prisms forming a cube which is placed directly in front of the lens. The material of these prisms is transparent to the radiation upon which the device is to operate and may ordinarily be glass. A reflecting surface, which may be a prism, is placed to one side of the cube and at a distance from it laterally preferably equal to the desired inter-ocular distance, and this reflecting surface is roughly parallel to the hypotenuses of the prisms, but so inclined with respect thereto as to produce the desired convergence of the image-carrying beams.

The cube is so positioned that the hypotenuses lie at the critical angle to the axial rays emerging from or entering the lens. Under these circumstances, the rays traversing the boundary between adjacent images at a focal plane of the lens, for example at the film, will also traverse a nodal point of the lens and will impinge upon the hypothenusal face of the prism functioning as a dividing prism at an angle X to the normal to the said face such that cosec X equals approximately the ratio of the index of refraction of the medium in the gap between the two prisms. Where air is the medium in the gap between two prisms, cosec X will equal approximately the index of refraction of the dividing prism.

It will be understood, inasmuch as a basic object of the invention is to provide a device for use in stereoscopic picture taking and projection, that, while a preferred form of the invention contemplates the positioning of the prism unit so that the hypothenuse of the dividing prism lies at the critical angle as defined to the axial rays, this condition may be modified where the axial rays do not coincide with the rays forming the boundary between adjacent images at the focal plane of the lens. Under such circumstances, the hypothenusal face of the dividing prism should preferably be so positioned as to intersect rays traversing the boundary line between the two images and a nodal point of the lens at the effective angle defined above, even though those rays may not coincide absolutely with the axial rays. This latter situation may arise, for example, if it is found desirable to employ a sound track and to utilize less than the entire film width for the reproduction of the stereoscopic images. The condition outlined previously may be defined as a condition wherein the light-dividing face of the light-dividing unit is positioned at the critcal angle of reflection to the axis of the objective lens.

The reflecting surface is preferably positioned to permit proper converging of the left- and right-eye beams in projecting and, in taking, to secure left- and right-eye images of the same field, irrespective of the distance of the field from the lens.

The device of this invention is adapted to form stereoscopic images on a film with a fine line therebetween. The right-eye image closely abuts against the left-eye image, and neither image blurs over into the other. If the images are formed in monochromatic light, and if the object photographed is at a great distance from the lens, the two stereoscopic images may abut with an almost imperceptible boundary line between them. Where, however, white light is employed, the hypothenuses of the prisms may not be positioned at the critical angle for all the wavelengths of the light coming from a single point, so that the dividing line will be in a slightly different place for one wavelength from what it is for another wavelength, resulting in a very slight broadening of the central line between the two images on the developed film. The use of collimating lenses is ordinarily unnecessary, as the central band or line is not large enough to become annoying. When the stereoscopic pictures are projected, the band or line of the film dividing them appears at the sides of the superimposed projected images, and may be projected off to the sides of the viewing screen, so as to be invisible to an observer.

In Fig. 1 is shown a diagrammatic representation of a simple form of the invention used either in connection with taking or projecting. As shown in Fig. 1, the device comprises two 45° prisms 10 and 11 positioned with their hypothenuses 12 and 13 adjacent, but with a gap therebetween. The air or other material in the gap has an index of refraction less than the index of refraction of the material of the prisms 10 and 11. The gap, or more accurately the material in the gap, is one of the elements of the device. The cube formed by the two prisms is positioned in front of the lens 14 in such a way that the hypothenuses 12 and 13 lie at the critical angle to the axial rays traversing the lens. Two prisms are employed, among other reasons to avoid chromatic and other aberrations. 15 represents a film, held and positioned within means providing a film gate 35, and 16 and 17 represent points on the film lying on either side of that line on the film which, in projection, gives rise to the axial rays. 17 may be assumed to be any point in the left-eye image and 16 may be assumed to be any point in the right-eye image.

18 will be deemed representative of the bundle of rays originating from or going to the point 17, and 19 representative of the bundle of rays originating from or going to the point 16.

The path taken in projection by the rays 19 may be seen by referring to Fig. 1. The right-eye stereoscopic image is impressed on these rays at the film 15. The rays then pass through the lens 14, through a color filter 20, if desired, and enter the prism 11. They traverse the prism and are totally internally reflected at the hypothenuse 13 thereof. They then continue to traverse the prism, and, after leaving it, are vertically reflected, as for example at 66. The rays are then again reflected, as for example at 70, so that as they leave the optical system, they will be directed to a viewing screen, not shown, on which they will impinge.

The path taken by the rays 18, which form the left-eye stereoscopic image, may be traced. After leaving the film 15, they pass through the lens 14, the color filter 20, if desired, and traverse the prism 11. They impinge upon the hypothenuse 13 of that prism at such an angle as to be refracted therethrough without being totally internally reflected. They then traverse the air gap between the two prisms and enter the prism 10, which acts as an achromatizing prism. The rays then leave this prism and are horizontally reflected, as at 26. They are then vertically reflected as at 56, and finally reflected as at 62 in such a way that, as they leave the optical system, they are directed toward the viewing screen, on which they impinge in superimposed relation with the rays 19. Both the rays 18 and 19 may traverse suitable polarizing elements 32 adapted to impart predeterminedly differing polarization characteristics to each beam.

In the modification shown diagrammatically in Fig. 2, the rays 19 forming the right-eye stereoscopic image traverse precisely the same paths as did the same bundle of rays in Fig. 1. The rays 18, however, are caused to traverse a different path. In this modification, the face 34 of the prism 10 is silvered to form a reflecting surface. The rays 18, after traversing the prism 11 and the prism 10, strike this face and are reflected. The rays continue to traverse the prism 10 and impinge upon the hypothenuse 12 thereof at such an angle as to be totally internally reflected therefrom. The rays continue to traverse the prism 10 and leave it by the unsilvered face 36. They are then vertically reflected as at 56 and again reflected as at 62 in the manner already described in connection with the description of Fig. 1.

The desired reflections as at 66, 70, 26, 56 and 62 may be effected by suitable prisms or other reflecting surfaces positioned to produce the reflections described above.

Although the descriptions of Figs. 1 and 2 have been in connection with the projection of stereoscopic images, it will be obvious that the systems there diagrammatically shown may be employed in the taking of stereoscopic pictures.

It should be noted that the system of Fig. 2 introduces an additional reflection in the beams carrying the left-eye stereoscopic image which should be considered in the selection of the systems employed in taking and projection if the same device is not employed in both.

Moving pictures are usually, and other pictures are sometimes, taken upon negatives positioned in frames which have one side longer than the other. In a 35 mm. film, the frames are about 35 mm. broad and 25 mm. high. These frames are used to take pictures of scenes which, accordingly, are about one and one-half times as broad as they are tall. The present device, instead of spreading one image across one frame, puts two stereoscopic images side by side across one frame, one image being at one end and the other at the other. Without any means for rotating the images, it will be seen that images thrown on a screen from these two images on the frame would each be narrower in a horizontal direction than their height because each in the half frame is still 25 mm. high but only about 17½ mm. broad. Stereoscopic pictures, when polarizers are used, are superimposed on the screen. Without means for rotating the images, the images on the screen will not occupy the total breadth of the screens now in use, which are broader than they are tall. By rotating the beams of light, both when the picture is taken onto the film and when it is projected from the film, it is possible to have an object or scene, broader than it is tall, reproduced so as to make the best use of the film gate and the screens already in operation. Horizontal lines in the scene being photographed are rotated into vertical lines in each stereoscopic image. In projection, these lines on the film each extend the long way of each of the two images but the short way of the film gate and are, by the rotating prisms, reproduced on the screen along the long dimension thereof so that the entire screen may be used.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A projector comprising a film gate, an objective positioned to transmit light rays from a plurality of images within said film gate, a prism unit positioned on that side of the objective away from said film gate, said unit comprising two prisms with their hypothenusal faces adjacent each other and separated by an air space, the normal to said faces meeting, at an angle X, rays traversing the boundary between said images in said film gate and traversing a nodal point of said objective, where cosec X equals substantially the index of refraction of the medium of said prisms, means providing a plurality of reflecting surfaces including one of said hypothenusal faces for rotating through an angle of substantially 90° about its axis of transmission one of said images, additional means, including the other of said hypothenusal faces and providing a further plurality of reflecting surfaces for rotating through an angle of approximately 90° about its axis of transmission the other of said images, the light rays carrying said images having common focal planes.

EDWIN H. LAND.